UNITED STATES PATENT OFFICE.

SEYMOUR M. HERMANN, OF NEW YORK, N. Y.

PROCESS OF MORDANTING BY MEANS OF CALCIUM ANTIMONY TARTRATE.

1,307,860. Specification of Letters Patent. Patented June 24, 1919.

No Drawing. Application filed April 30, 1917. Serial No. 165,357.

*To all whom it may concern:*

Be it known that I, SEYMOUR M. HERMANN, a citizen of the United States, residing in New York, in the county of New York and State of New York, have invented certain new and useful Improvements in Processes of Mordanting by Means of Calcium Antimony Tartrate, of which the following is a specification.

The object of my invention is to provide a new and improved process of antimondlle or calcium acid tartrate of antimony mordanting, of textile and other fabrics or fibers, and to provide a new chemical compound which is of simple, cheap and efficient form, by the use of which process and compound, the fibers and fabrics, if treated with basic colors, will have the colors permanently fixed, so as not to be susceptible of reduction in shade by washing, or by sun-light, acids, alkalis, or other bleaching agents or processes so far as now known.

The main essential and basic principle, of my improved process of mordanting, consists fundamentally in first impregnating the animal or vegetable fibers or fabrics to be treated with a suitable tannin solution and thereafter impregnating the fibers so treated with tannin with a suitable solution or solutions containing a product combining with antimony-oxid as hereinafter set forth, sometimes and for certain fabrics to saturation; the antimony-oxid content of said solution constituting approximately fifty per cent. (50%) of all of the chemical salts dissolved therein.

In carrying out such process I first, by treatment in the manner well-known in the art, and by immersion in proper solutions containing tannins, thoroughly impregnate the animal or vegetable fiber to be mordanted, for dyeing, with suitable quantities of tannin; and after such fibers or fabrics are put through the tannin treatment and dried the same are then immersed in a second bath solution usually and preferably having a content of approximately fifty per cent. (50%) of antimony-oxid in and of all the compound salts dissolved therein; and usually being substantially saturated with said dissolved salts.

And I have found in the carrying out of such improved process of my invention that good and valuable results are brought about by immersing the goods in such solution, either cold or heated for several hours, so as to thoroughly impregnate the goods therewith.

Thereafter the fibers or fabrics, so treated and mordanted are immersed in the usual manner well-known in the art of dyeing, in proper dyeing solutions of any desired color, tint, or shade, preferably but not necessarily, those of what are known as the basic dyes, in the manner well-known in the art.

Upon being so immersed in the dye-solutions of the required color, the double salt of calcium acid tartrate of antimony, which has been chemically precipitated in the fibers or fabrics, will chemically combine with the tannin with which the fibers were first treated, in such manner as to form fast colors, practically not affected by washing, fulling, sunlight, acids, alkalis, or bleaching.

In forming the salt of the formula hereinbefore given, the proper weight of tartaric acid is dissolved in water and boiled. Then a light proportion of calcium chlorid in highly concentrated form is added, and is boiled in order to expel therefrom hydrochloric acid gas, and thereupon a sufficient quantity of bicarbonate of soda is now added, and the boiling continued, after which it is permitted to become cold, and the calcium acid tartrate thus formed then purified in the manner well-known in the chemical art.

I have found the following quantities by weight, of the various ingredients chemically combined to form said calcium acid tartrate to be highly efficient, although I do not intend broadly to limit myself to the exact following proportions expressed in avoirdupois weight, viz:—

Calcium chlorid ($CaCl_2$) one and one half pounds to two pounds; (1.5 to 2 lbs.).

Tartaric acid $H_2$ ($C_4H_4O_6$) two to three pounds (2 to 3 lbs.).

Bicarbonate of soda ($NaHCO_3$) from two to six ounces, (2 to 6 oz.), and at least enough to neutralize the remaining free hydrochloric acid; and I have found that temperature and humidity will affect somewhat the various proportions necessary to bring about the best results in any given case.

The second step in the making of my compound consists in taking the calcium acid tartrate formed as previously noted, and boiling with a substantially equal amount of antimony oxid in a requisite amount of water, and in which an amount of sodium chlorid is then added in an amount of about one-twentieth of the bulk of the two products above noted. During the boiling of this compound, which may take several hours, tests are made from time to time in order to ascertain the percentage of antimony oxid which has entered into solution with the acid calcium tartrate, and then upon the desired completion of the operation, the resulting solution is filtered and thereafter crystallized and dried in the usual manner.

With respect to the word "antimonelle,"—this is the name by which applicant's calcium acid tartrate of antimony is known in the trade.

The resulting product would approximately be a double salt according to the laws of certain chemical reactions, containing antimony oxid combined with an acid tartrate of calcium and will contain about fifty per cent. (50%) of available antimony oxid, which will be taken up in the fibers during the process of mordanting from the aqueous solution thereof; and when the tannate in the fibers has taken up and combined with all the free antimony it will take up; if any antimony be left in the solution, this may be saved by rejuvenating the solution by the continuation of the process, and the solution used over and over again, being rejuvenated between each insertion of materials to be mordanted, but when the tannate in the fabrics and my antimonelle compound are properly proportioned to the amount of material to be mordanted, so that the tannate present in the fibers or fabric to be mordanted is slightly in excess of the amount required to take up all of the antimony-oxid in the bath solution, all of the antimony-oxid in the solution will be taken, and the spent liquor being of no value is sewered away.

It is evident that many changes and modifications in my improved process herein described, and in the chemicals used, may be made without departing from the scope of my invention and I do not intend to limit myself strictly to the exact chemical, nor to the sequence of steps herein set forth.

I claim:

1. A method of mordanting consisting first in impregnating the material with tannin, then drying the impregnated material and thereupon impregnating such tannin-impregnated-material with a solution containing calcium acid tartrate of antimony.

2. The method of producing the solution of calcium acid tartrate of antimony consisting in first boiling fused calcium chlorid with tartaric acid in excess, then boiling to eliminate the hydrochloric acid produced, adding bicarbonate of soda to neutralize any remaining hydrochlorid acid, then purifying the product obtained therefrom, and thereupon adding the requisite amount of antimony oxid and boiling, and testing for the percentage of antimony oxid until a fifty per cent. content of antimony oxid is obtained.

3. The method of producing a mordanting product of which fifty per cent. is antimony oxid in which the antimony oxid is completely dissolved, consisting in boiling the antimony oxid with a solution containing acid calcium tartrate substantially as set forth.

4. The method of producing a mordanting product containing antimony oxid in which the antimony oxid is completely dissolved, consisting in boiling the antimony oxid with a solution containing acid calcium tartrate substantially as set forth.

SEYMOUR M. HERMANN, Ph. D.

Witnesses:
H. I. SIEGEL,
H. D. PENNEY.